May 25, 1965

R. E. BELL ETAL 3,185,229

INDICATOR

Filed July 16, 1962

INVENTORS.
ROBERT E. BELL
BY FREDERICK C. CARROLL
WILLIAM H. GALLO

Marshall, Wilson, Click & Yeasting

ATTORNEYS

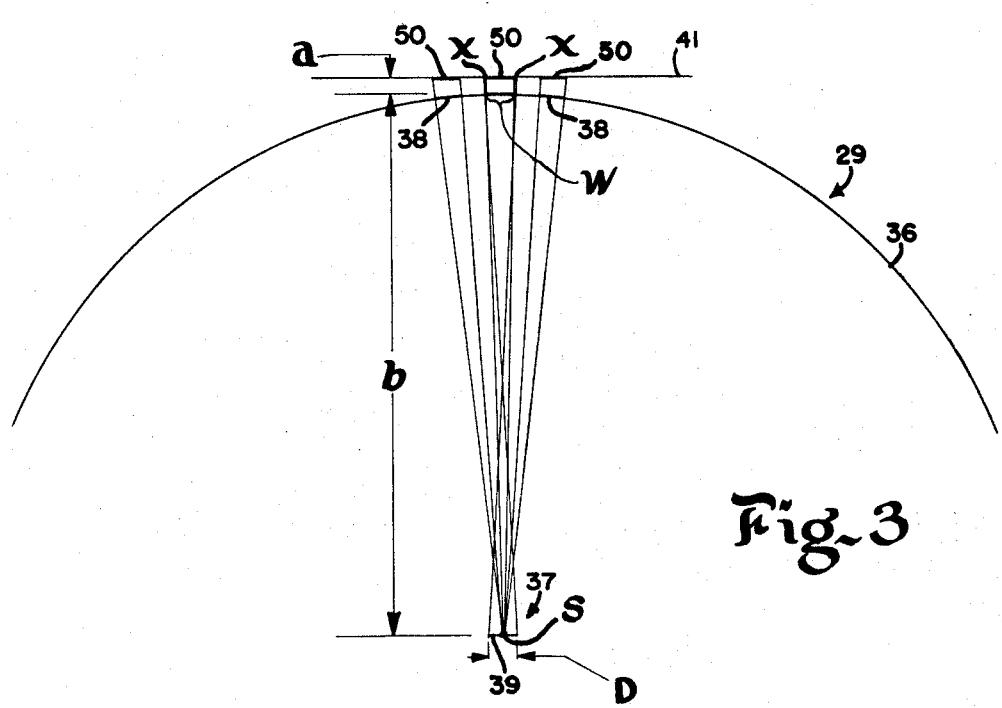
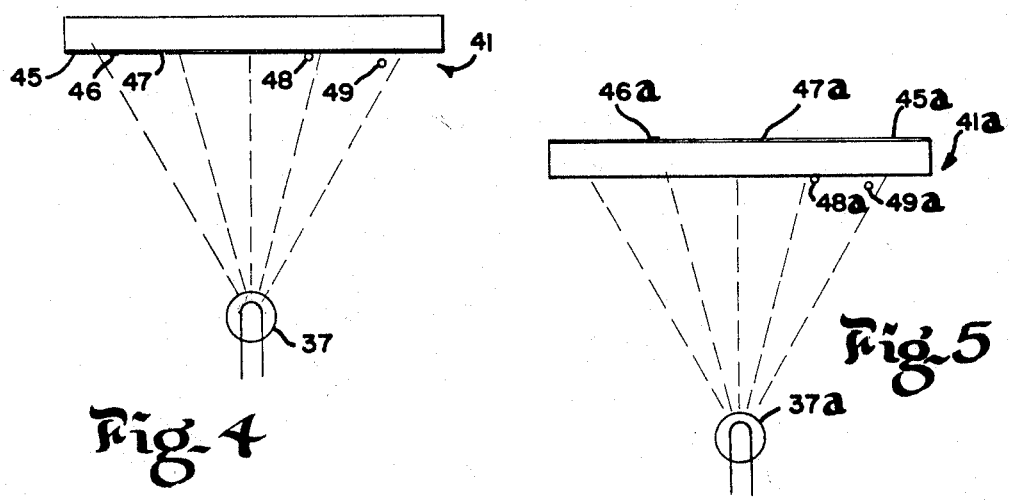

May 25, 1965  R. E. BELL ETAL  3,185,229

INDICATOR

Filed July 16, 1962  4 Sheets-Sheet 3

INVENTORS.
ROBERT E. BELL
FREDERICK C. CARROLL
BY WILLIAM H. GALLO

Marshall, Wilson, Click & Heating
ATTORNEYS

May 25, 1965  R. E. BELL ETAL  3,185,229
INDICATOR

Filed July 16, 1962  4 Sheets-Sheet 4

INVENTORS.
ROBERT E. BELL
FREDERICK C. CARROLL
BY WILLIAM H. GALLO

ATTORNEYS

United States Patent Office 3,185,229
Patented May 25, 1965

3,185,229
INDICATOR
Robert E. Bell, Frederick C. Carroll, and William H. Gallo, Toledo, Ohio, assignors to Toledo Scale Corporation, Toledo, Ohio, a corporation of Ohio
Filed July 16, 1962, Ser. No. 209,860
22 Claims. (Cl. 177—37)

This invention relates to new techniques and means for projecting indications from indicia-bearing charts.

The new techniques and means employ no optics and are particularly well suited for use in instruments such as condition responsive measuring instruments.

Prior condition responsive measuring instruments, such as weighing scales, having indications projected from indicia-bearing charts employ optical projection systems which are unsatisfactory because of their high cost and the necessity, in computing scales, to shift such projection systems along the charts to positions corresponding to desired price columns.

Prior condition responsive measuring instruments, such as weighing scales, having non-projected indications are unsatisfactory because of parallax, poor appearance, and difficulty in reading such indications.

Accordingly, the objects of this invention are to improve instrument indicating devices, to increase the precision of such devices, to simplify the construction of such devices, to improve the appearance of such devices, to provide new techniques and means for projecting indications from indicia-bearing charts, and to provide projection systems having wide fields of view.

One embodiment of this invention enabling the realization of these objects is a combination of a condition responsive indicia-bearing chart, a translucent display screen, and a light source for projecting shadows of the indicia onto the screen, the shadow images being seen on the screen in the same plane as an index line. The distances between the light source and the chart and between the chart and the screen, the size of the light source, and the line width of the chart indicia (figures and graduations) are such that sharp images are obtained.

In accordance with the above, one feature of this invention resides in a projection system employing no optics which nevertheless produces sharp indications from condition responsive indicia-bearing charts. The usual projection system used with such charts employs among other elements a projection lens. Hence, relative to such prior projection systems, the projection system of the invention has superior simplicity.

Another feature resides in a projection system which provides a wide field of view. For example, in computing retail weighing scales, the projection system of the invention projects the entire width of the load-responsive charts at once. This has never been done in such scales before. Prior projection systems in such scales must be shifted along the charts to positions corresponding to desired price columns, the projection systems then producing projected indications of the value figures within their narrow fields of view that correspond to the selected prices.

A further feature resides in the good looks imparted to an instrument by the sharp and brilliant images produced by the indicating device.

The above and other objects and features of this invention will be appreciated more fully from the following detailed description when read with reference to the accompanying drawings wherein:

FIG. 3 is a diagram illustrating the principle of operation of the projection system shown in FIGS. 1 and 2;

FIG. 4 is a diagram showing four index lines associated with a display screen any one of which is suitable for use in the projection system shown in FIGS. 1 and 2;

FIG. 5 is a diagram showing a modification of the display screen and the index lines illustrated in FIG. 4;

Figure 1:
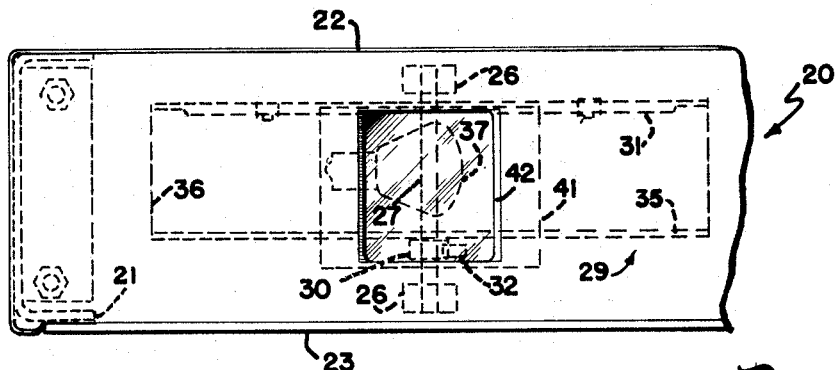
FIG. 1 is a fragmentary plan view of a weighing scale incorporating the projection system of the invention.
Figure 2:
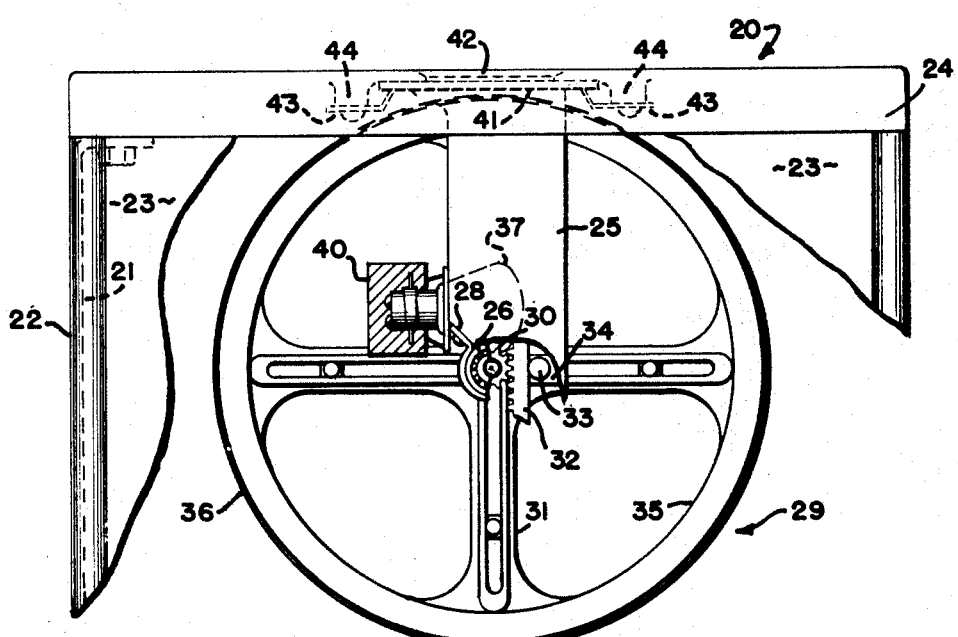
FIG. 2 is a fragmentary front elevational view of the scale shown in FIG. 1 having its housing broken away to reveal structure in the interior.

Referring to the drawings, in FIGS. 1 and 2 a projection system as contemplated in this invention is shown incorporated in an airline baggage weighing scale. The scale includes a casting 20 forming the top of the scale and supported on legs 21, only one of which is shown, a sheet metal member 22, embracing three sides of the casting 20, forming the back and sides of a housing, and a removable front cover 23. The casting 20 is provided with side skirts 23 and a pair of spaced legs 25, only one of which shown, which support a pair of ball-bearings 26 that in turn support a rotatable chart tube shaft 27 journaled in the bearings 26. Brackets 28 function to attach the bearings 26 to the legs 25.

A cylindrical weight chart 29 and a pinion 30 are fixed on the shaft 27. The pinion 30 is pinned to the shaft 27 in the same manner as a corresponding pinion is pinned to a corresponding shaft disclosed in U.S. application Serial No. 142,844, filed October 4, 1961, in the anme of F. C. Carroll and issued as U.S. Patent No. 3,100,720, on Aug. 13, 1963. The chart 29 is located on the shaft 27 closely adjacent the pinion 30 and includes a spider 31 which is like and which is attached to the shaft 27 like the chart spiders disclosed in such application. The pinion 30 is meshed with a rack 32 having its lower end (not shown) operatively connected to ordinary weighing mechanism (not shown). A corresponding rack operatively connected to weighing mechanism is disclosed in the above U.S. application Serial No. 142,844 (U.S. Patent No. 3,100,720). Movement of the weighing mechanism is transmitted through the rack 32 and pinion 30 to rotate the cylindrical chart 29 through equal increments of angle for equal increments of load upon the scale. Hence, the chart 29 is condition responsive. The rack 32 is kept in engagement with the pinion 30 by means of a guide roller 33 mounted for rotation on a member 34 extending from one of the casting legs 25.

The chart also includes a second spider 35 in the form of a ring having the same diameter as the spider 31 and being connected to the spider 31, for concentric rotation about the axis of the shaft 27, by means of a thin indicia-bearing sheath or skin 36. The spider 35 has the form of a ring to allow lead wires (not shown) to extend into the chart 29, in an unobstructed path during rotation of the chart 29, for connection with a light source 37 having a purpose hereinafter described. The spider 35 can be made by cutting the spokes out of a spider like the spider 31.

The indicia (figures and graduations), which are opaque, are printed on the sheath or skin 36, while the sheath is flat, the indicia serving to indicate the weight of an article placed upon the scale as hereinafter described. Three of the graduations are shown enlarged in FIG. 3 in diagrammatic form as indicia 38. The printing itself is accomplished in the same manner as printing is accomplished on any ordinary cylindrical chart such as the charts shown in the above U.S. application Serial No. 142,844 (U.S. Patent No. 3,100,729). The sheath or skin 36 can be made of any plastic or synthetic resin which is transparent, dimensionally stable relative to the material of the spiders with temperature changes, rigid enough when rolled into a cylinder to retain its cylindrical shape, and light enough to keep chart inertia to a practicable level. A suitable material for the sheath or skin 36 is transparent Mylar, a polyester film, having a sheet thickness of 0.005 inch. It has been found that such thickness is light enough to keep chart inertia relatively low and yet provide, when rolled into a cylinder, a rigid cylinder that retains its cylindrical shape. The Mylar sheath is rolled and cemented to the spiders 31 and 35 and has a cemented or welded seam, the ring spider 35 serving to keep the cylinder as a right cylinder. Accordingly, the cylindrical weight chart 29 is transparent and bears opaque indicia. Alternatively, the chart 29 can be opaque and the indicia transparent to obtain projected weight indications. In a broader sense, the chart and the indicia must have different degrees of transparency. For example, the chart can be transparent (colored or clear) and the indicia can be black and opaque, or the chart can be black and opaque and the indicia can be transparent (colored or clear), i.e., the chart has a first degree of transparency bearing indicia having a second degree of transparency differing from that of the chart. The transparent chart 29 is part of a shadow projection system hereinafter described for obtaining projected weight indications.

The light source 37, which is an ordinary automobile front head lamp having a filament 39 (FIG. 3), is supported in a suitable stationary holder 40 adjacent the chart shaft 27 and functions to cast shadows of the opaque chart indicia 38 onto a translucent (colored or white) display screen 41. The display screen 41 is held juxtaposed to an opening 42 in the casting 20 by means of clips 43 fixed to bosses 44 on the casting 20 and is made of glass having an emulsion coating 45 (FIG. 4) on its lower side, the shadows of the indicia being cast on the coated side of the screen. The emulsion coating makes the display screen 41 translucent and permits viewing of the images from wide angles. This is in contrast to screens made translucent by sand blasting which must be viewed squarely in order to see images clearly. However, sand-blasted screens are usable in the projection system. Any one of four reading or index lines formed by means of an opaque printed line 46 or a scratch 47 or wires 48 and 49 (FIG. 4) may be used. Line 46 is printed on the emulsion coating 45. Scratch 47 is scratched in the emulsion coating 45. Wire 48 touches the emulsion coating 45, part of its reading line being formed by the wire itself and part being formed by shadows cast by portions of the wire which do not contact the coating 45. Wire 49 does not touch the emulsion coating 45, the shadow cast by the wire forming the reading line. Wires 48 and 49 cast shadows on the coating 45 because they are between the coating and the light source 37. In all cases, the weight of an article upon the scale is indicated on the display screen 41 at which ever one of the reading lines is used. Also, in all cases the shadows or images of the chart indicia are seen by an observer looking through the opening 42 in the casting 20 in the same plane as the reading line. This plane is always the emulsion plane. That is, the shadows of the chart indicia and the reading line always appear to be in the same plane. This obviates parallax.

Figure 10:
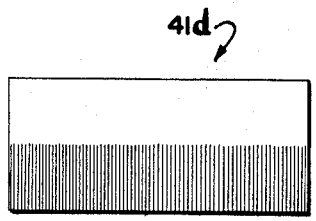
FIG. 10 is a front elevational view of a display screen having an index means suitable as a substitute for any one of the four index lines shown in FIG. 4 or FIG. 5.
Figure 11:
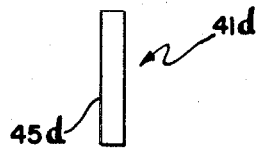
FIG. 11 is an end elevational view of the display screen shown in FIG. 10.

Alternatively, the index means shown in FIGS. 10 and 11 can be substituted for any one of the four index lines shown in FIG. 4. The display screen 41d (FIGS. 10 and 11) has an emulsion coating 45d which makes the screen translucent. The lower half of the coating 45d is colored red or pink as indicated by the color code in FIG. 10 and the upper half of the coating is clear (can be a color different from that of the lower half of the screen). The boundary, where the two colors (shadow images show through the colors) meet or the line of demarcation, is the index line. This index line has no width to conceal the indicia images because one looks along the edge of the red or pink portion. The index lines shown in FIG. 4 are practicable but, especially when they are enlarged by a magnifier, and, particularly in certain orientations of the chart, they can conceal projected indicia to the extent that makes rapid reading difficult. The index means shown in FIGS. 10 and 11 helps make the first known perfect projected indication, perfect in that, since the shadow images of the chart indicia and the reading line always appear to be in the same plane, parallax is obviated and, since the boundary where the two colors meet has no width, such images of the chart indicia are never concealed by the reading line.

Usually it is desirable to have the emulsion coating 45 on the lower surface of the screen 41 to facilitate washing the screen through the opening 42. However, the emulsion coating may be on the upper surface of the screen as shown in FIG. 5. Reference numbers in FIG. 5 which are similar to those in FIGS. 1–4 identify parts which are alike in structure and function.

In prior weighing scales having non-projected indications, reading lines are formed by wires stretched closely adjacent the scale charts. Such wires must be very close to the charts to minimize parallax requiring very accurately made and assembled parts to prevent the charts from touching the wires when they rotate. In the present system, the display screen 41 is located relatively far from the cylindrical chart 29 so that tolerances can be relaxed and yet parallax is completely obviated.

In operation, movement of the weighing mechanism caused by change in load upon the scale rotates the condition responsive cylindrical chart 29. The weight of an article upon the scale is indicated on the display screen 41 at the index or reading line. The shadow image of the chart weight indicia and the reading line appear to be in the same plane, i.e., the plane of the emulsion coating 45.

The shadow projection system employs no optics and, therefore, has great simplicity, yet it produces sharp, brilliant indications. All prior projected indication weighing scales employ relatively complicated optical systems having projection lenses. In the present system, as illustrated in FIGS. 3, 12 and 13, the distances between the light source and the chart and between the chart and the screen, the size of the light source, and the line width of the chart indicia (figures and graduations) must be such that sharp images are obtained.

Figure 12:
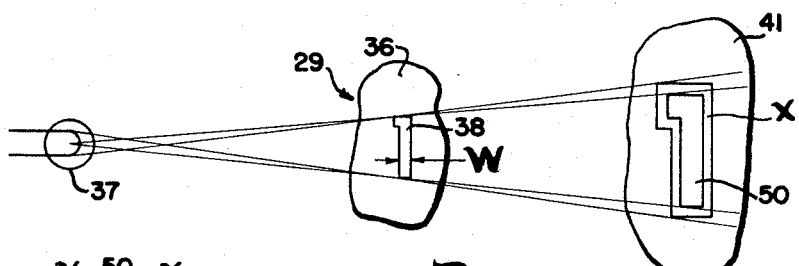
FIG. 12 is a diagram amplifying the illustration of FIG. 3 to further illustrate the principle of operation of the projection system shown in FIGS. 1 and 2.
Figure 13:
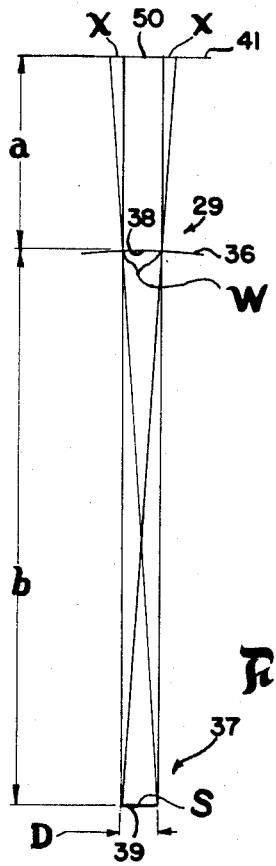
FIG. 13 is another diagram amplifying the illustration of FIG. 3 to further illustrate the principle of operation of the projection system shown in FIGS. 1 and 2.

Referring to FIGS. 3, 12 and 13, the letter $a$ represents the distance between a line drawn tangent to the chart 29 and parallel to the display screen 41 and the bottom surface of the screen, i.e., the distance between the chart and the screen, the letter $b$ represents the distance between the light source filament 39 and such tangent line, i.e., the distance between the light source and the chart, the letter $D$ represents the length of the filament 39, the letter $S$ represents a theorectical point source, the letter $W$ represents the line width of the chart indicia, i.e., the line width of figures and graduations, and the letter $X$ represents blurred, fuzzy, gray image areas. The letter $W$ is shown applied in FIGS. 3 and 13 to the line width of a chart graduation and in FIG. 12 to the line width of a chart figure. Light from the theoretical point source $S$ causes shadows 50 of the chart indicia 38 to be cast on the display screen 41. When the filament 39 is substituted for the point source S, light from the filament causes the same shadows 50 to be cast on the display screen, since the filament contains a point source. In addition, light rays directed from the ends of the filament add increments X around the shadow images 50. These increments X are partial shadows and are blurred, fuzzy, gray areas. However, these blurred, fuzzy areas are so tiny in the arrangement shown in FIG. 3, for example, that they are insignificant, the images 50 being sharp and brilliant. The length $a$ shown in FIG. 3 is so small that no magnification of the chart indicia is seen by the eye.

The ration of $b$ to $a$ depends on the line width W of chart figures and graduations 38 which make up the projected figures and graduations 50. The ratio of $b$ to $a$ shown in FIG. 3 has been found to produce good images. Such ration shown in FIGS. 12 and 13 has been made smaller to more clearly illustrate the gray zone X in FIG. 12 and the similar triangles formed by the light beams in FIG. 13. From FIG. 13, $$\frac{a}{b} = \frac{X \text{ (base of triangle)}}{D \text{ (base of triangle)}}$$

or $$X = \frac{aD}{b}$$

and let $$\frac{W}{X} = \text{image quality factor}$$

Although $$\frac{W}{X}$$

may have any moderately large value and still produce a readable image, for good quality it should have a value as large as possible. For example, a good image is produced when $$\frac{W}{X} = 4 \text{ or } W = 4X$$

then $$\frac{b}{a} = \frac{4D}{W}$$

Increasing $$\frac{W}{X}$$

from such value of 4 improves image sharpness. It can be seen in FIG. 3 as the length of the filament is lengthened from S to D, that the blurred, fuzzy areas X increase. Hence, decreasing D improves image quality. Also, it can be seen that if the filament 39 were moved toward the chart 29 to reduce the size of the ratio of $b$ to $a$ that the size of the blurred, fuzzy areas X would increase. Hence, increasing the ratio of $b$ to $a$ improves image quality.

Figure 6:
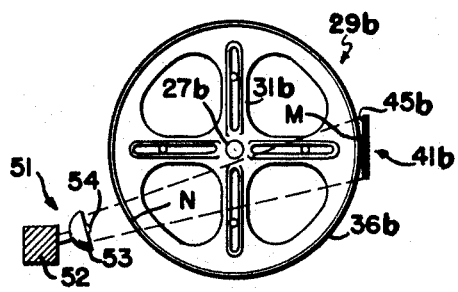
FIG. 6 is a view similar to FIG. 2 showing a modification of the projection system.
Figure 7:
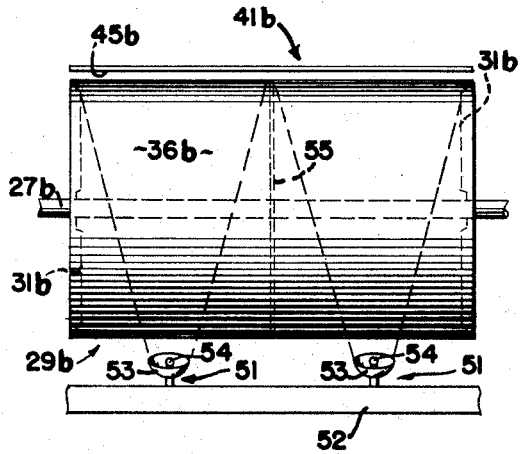
FIG. 7 is a plan view of the device shown in FIG. 6.

A modification of the projection system is shown in FIGS. 6 and 7. The chart 29 shown in FIGS. 1–3 is a cylindrical weight chart incorporated in an airline baggage scale. A chart 29b shown in FIGS. 6 and 7 is a cylindrical computing scale chart incorporated in a retail scale, the chart 29b having columns of weight and value indicia. Reference numbers in FIGS. 6 and 7 which are similar to those in FIGS. 1–5 identify parts which are alike in structure and function. Because of the relatively great length of the chart 29b, its indicia-bearing skin or sheath 36b is supported at each of its ends by a spoked spider 31b instead of being supported at one end by a spoked spider 31b and at its other end by a spider in the form of a ring, like the spider 35, as is the chart 29 (FIGS. 1–3). In operation, movement of the weighing mechanism caused by change in load upon the scale rotates the condition responsive cylindrical chart 29b. The weight of an article upon the scale is indicated on the display screen 41b at the index or reading line and the computed value of such article also is indicated on the display screen at the index or reading line, the particular column of value indicia being selected in accordance with a selected unit price in a price range which is printed on a coated side 45b of the display screen 41b. This is the usual operation of a computing weighing scale of the type used in retail food stores. The indicia on the chart 29b are very small. Hence, a magnifying lens (not shown) is provided in juxtaposition with the display screen 41b.

Because one or the other of the spoked spiders 31b would contact any leads connected to a light source located inside the cylindrical chart 29b during rotation of the chart, light sources 51 are located outside the chart 29b and are supported on a stationary member 52 as shown in FIGS. 6 and 7. Two light sources 51 are used because of the relatively great length of the cylindrical chart 29b. Each of the light sources 51 includes a parabolic reflector 53 of the type found in flashlights and a bulb 54 which is so located relative to the focal point of the reflector that the light rays diverge as shown in FIGS. 6 and 7. An opaque disc baffle 55 carried by the shaft 27b prevents light rays from one source from becoming mixed with light rays from the other source. Mixing of such light rays would cause a double image to be seen on the display screen 41b. The parabolic reflectors tend to improve image quality since they partially collimate the light. Collimated light produces an optical effect equivalent to a point source located at an infinite distance from the screen.

In addition to the above feature of employing no optics, one of the principal features of the projection system resides in a projection system which provides a wide field of view. In prior computing retail projected indication scales, the projection systems must be moved along the charts to selected unit prices in the price ranges, the projection systems then producing projected indications of the value figures within their narrow fields of view that correspond to the selected prices. In sharp contrast, the projection system shown in FIGS. 1–7 projects the entire width of the charts at once. This has never been done before. That is, the present system without optics accomplishes something that prior systems even with optics cannot do. With reference to FIG. 7, the entire width of the chart 29b is projected onto the display screen 41b at once. Images of computed values appear on the entire width of the display screen 41b at once. The scale operator needs only to run his eye along the price range to the particular unit price of the article being weighed and then observe the value figure at the reading line which corresponds to the selected price.

In addition to the features described above, the projection system shown in FIGS. 6 and 7 features the unique projection of light through the chart twice, yet only the shadows of those indicia which are located in chart area M adjacent the display screen 41b can be seen on the display screen. This is because of the size of the ratios $b/a$ (defined above—see FIG. 3). The shadow images from chart area N (FIG. 6) are lost because instead of having the display screen 41b close to chart area N, as the display screen 41 is close to the chart 29 (FIGS. 1–3), and instead of having the source 51 far from chart area N, as the source 37 is far from the chart 29 (FIGS. 1–3), just the opposite is true. That is, instead of having a ratio of $b/a$ relatively large as shown in FIG. 3, the ratio of $b/a$ in the arrangement shown in FIGS. 6 and 7 in connection with chart area N is relatively small to produce such large blurred, fuzzy, gray image areas that the shadow images from chart area N cannot be observed on the display screen 41b and are, accordingly, lost. See the blurred, fuzzy, gray image areas X in FIGS. 3, 12 and 13. Hence, the light sources 51 direct light rays through the chart area N toward the display screen 41b without casting any shadow images from the chart area N onto the screen which are apparent to the eye. However, the ratio of b/a in connection with chart area M is another matter. Just as the ratio of b/a is relatively large as shown in FIG. 3, the ratio of b/a is relatively large as shown in FIG. 6 in connection with chart area M. In fact, the ratio of b/a shown in FIG. 6 in connection with chart area M is very large—the ideal arrangement. Accordingly, the light sources 51 direct light rays through the chart areas N and M onto the display screen 41b causing brilliant, sharp shadow images of the indicia in the chart area M to be projected onto the display screen.

Figure 8:
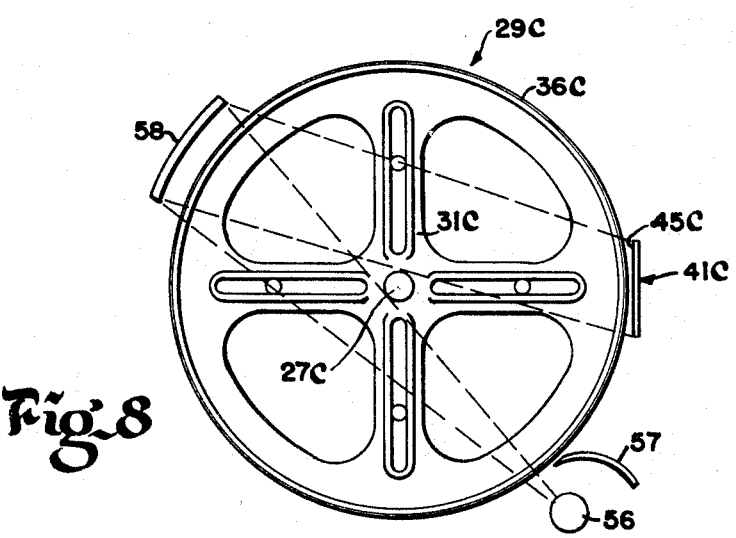
FIG. 8 is a view similar to FIG. 2 showing another modification of the projection system.
Figure 9:
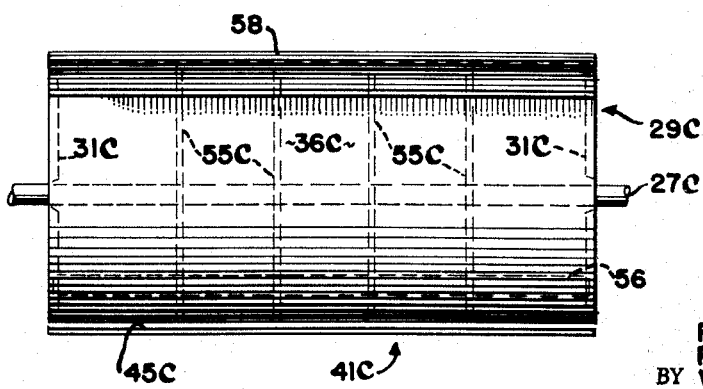
FIG. 9 is a plan view of the device shown in FIG. 8.

Another modification of the projection system is shown in FIGS. 8 and 9. A chart 29c is a cylindrical computing scale chart like the chart 29b (FIGS. 6 and 7). The system shown in FIGS. 8 and 9 is useful in modifying existing scales which already are provided with a light source 56 in the form of a flourescent tube having a length about equal to the width of the cylindrical chart 29c. Reference numbers in FIGS. 8 and 9 which are similar to those in FIGS. 1–7 identify parts which are alike in structure and function.

Light from the light source 56, which cannot reach the display screen 41c directly because of a stationary shield 57, is directed twice through the chart 29c, as shown in FIG. 8 onto a stationarily mounted curved mirror 58 having a length about equal to that of the tube light source 56. The mirror 58, which could be flat if the light source were bright enough, is curved to suit the point where the light beams are to be focused and reflects the light as indicated by the broken lines in FIG. 8 through the chart 29c twice just as the light beams from the light sources 51 (FIGS. 6 and 7) pass through the chart 29b twice. That is, the systems shown in FIGS. 6 and 7, and FIGS. 8 and 9 are comparable, the mirror 58 taking the place of the light sources 51. As described in connection with FIGS. 6 and 7, shadow images from the chart area adjacent the mirror 58 are lost and brilliant, sharp images of the chart indicia positioned adjacent the display screen 41c appear on such screen. Instead of having a single opaque disc baffle carried by the chart shaft as shown in FIG. 7, the system shown in FIGS. 8 and 9 is provided with four baffles 55c which help prevent the appearances of unwanted shadow images on the display screen 41c.

It is to be understood that the above description is illustrative of this invention and that various modifications thereof can be utilized without departing from its spirit and scope.

Having described the invention, we claim:

1. A weighing scale comprising, in combination, a load responsive indicia-bearing chart, the chart and the indicia having first and second degrees of transparency, a translucent display screen, and means for projecting shadow images of the indicia onto one side of the screen, the indicia being located between the screen and the projecting means while their images are being projected and being so close to the screen while their images are being projected that no apparent magnification occurs.

2. A weighing scale according to claim 1 wherein the chart is transparent and the indicia are opaque.

3. A weighing scale according to claim 1 wherein the chart is opaque and the indicia are transparent.

4. A weighing scale comprising, in combination, a load responsive indicia-bearing chart, a display screen, and means for projecting shadow images of the indicia onto the screen, the distance between the chart and the screen being less than the distance between the chart and the means for projecting.

5. A weighing scale comprising, in combination, a load responsive indicia-bearing chart, the chart having substantial width with the indicia being arranged in columns along said width, a display screen, and means for projecting shadow images of the indicia onto the screen, said means projectng the entire width of the indicia-bearing portion of the chart at once.

6. A weighing scale comprising, in combination,, a load responsive indicia-bearing chart, the chart having substantial width with the indicia being arranged in columns along said width, a display screen, and means for projecting shadow images of the indicia onto the screen, said means projecting a portion of at least two columns at once.

7. A weighing scale comprising, in combination, a condition responsive cylindrical chart bearing indicia, a display screen adjacent the chart, and light source means located outside the chart, and having an element for directing light through cylindrical chart sides twice toward the screen to project shadow images of chart indicia located adjacent the screen onto the screen, the chart being located between the screen and the element.

8. A weighing scale according to claim 7 wherein the light source means includes a parabolic reflector.

9. A weighing scale according to claim 7 wherein the entire width of the chart is projected at once.

10. A weighing scale according to claim 7 wherein the screen is at a first side of the chart, the light sources means is at a second side of the chart, and the light is directed through said chart sides toward the screen, whereby shadow images from the indicia on said first chart side are projected onto the screen.

11. A weighing scale according to claim 7 wherein the screen is at a first side of the chart, the light source means includes a reflecting surface at a second side of the chart, and light is directed by the reflecting surface through said chart sides toward the screen, whereby shadow images from the indicia on said first chart side are projected onto the screen.

12. A weighing scale according to claim 11 wherein the light source means includes a fluorescent tube having a length about equal to the width of the cylindrical chart.

13. A weighing scale according to claim 7 wherein the light source means includes a plurality of light sources.

14. A weighing scale according to claim 13 wherein the chart is provided with baffle means for preventing light rays from any one of the sources from becoming mixed with light rays from another source.

15. A weighing scale comprising, in combination, a condition responsive indicia-bearing cylindrical chart, a stationary display screen, and means for projecting shadow images of the indicia onto the screen.

16. A weighing scale comprising, in combination, a condition responsive indicia-bearing chart, a display screen, and means for projecting shadow images onto the screen of substantially the entire width of the chart at once.

17. A weighing scale comprising, in combination, a condition responsive indicia-bearing chart, a display screen, means for projecting shadow images of the indicia onto the screen, and parallax obviating index means for said images.

18. A weighing scale comprising, in combination, a cylindrical chart including a condition responsive spider having an annular rim, an indicia-bearing sheath carried in the form of a righ cylinder on the rim, and annular means carried by the sheath for keeping the right cylindrical shape of the chart, a display screen, and light source means located inside the cylindrical chart for casting shadow images of the chart indicia onto the screen, said annular means providing an unobstructed path from a point outside the chart to the light source during movement of the chart.

19. In a weighing scale, in combination, projection means, and a cylindrical chart surrounding the projection means and comprising; a condition responsive spider having an annular rim, an indicia-bearing synthetic resin sheath having a temperature coefficient of expansion about the same as that of the spider and carried in the form of a right cylinder on the rim, and a ring carried by the sheath for keeping the right cylindrical shape of the sheath and providing an unobstructed path from outside the cylinder to the projection means inside the cylinder during movement of the chart.

20. In a weighing scale, a cylindrical chart comprising, in combination, a condition responsive spider having an annular rim and an indicia-bearing synthetic resin sheath dimensionally stable relative to the material of the spider with temperature changes carried in the form of a right cylinder on the rim.

21. A cylindrical chart comprising, in combination, a spider having an annular rim and an indicia-bearing Mylar sheath carried in the form of a right cylinder on the rim.

22. In a weighing scale, a cylindrical chart comprising, in combination, a condition responsive spider having an annular rim and an indicia-bearing plastic sheath having high stiffness relative to its mass carried in the form of a right cylinder on the rim.

References Cited by the Examiner

UNITED STATES PATENTS

| | | | |
|---|---|---|---|
| 1,487,514 | 3/24 | Goss | 88—24 |
| 1,721,398 | 7/29 | Jacob | 88—24 |
| 1,880,415 | 10/32 | Carroll | 88—24 |
| 2,245,970 | 6/41 | Frantz | 88—24 |
| 2,273,591 | 2/42 | Powell | 88—24 X |
| 2,541,365 | 2/51 | Kauffman | 88—24 |
| 2,566,711 | 9/51 | Wells et al. | 177—178 X |
| 2,579,806 | 12/51 | Dvorkin | 88—24 |
| 2,641,159 | 6/53 | Mihalakis | 88—24 |
| 2,731,880 | 1/56 | Beeson | 88—24 |
| 2,823,639 | 2/58 | Vistain et al. | 116—124.4 |
| 2,826,113 | 3/58 | New | 88—24 |
| 2,834,250 | 5/58 | Stefani | 88—24 |
| 3,029,772 | 4/62 | Thompson | 116—124.4 |
| 3,100,720 | 8/63 | Carroll | 177—37 |

LEYLAND M. MARTIN, *Acting Primary Examiner.*